Patented Dec. 8, 1936

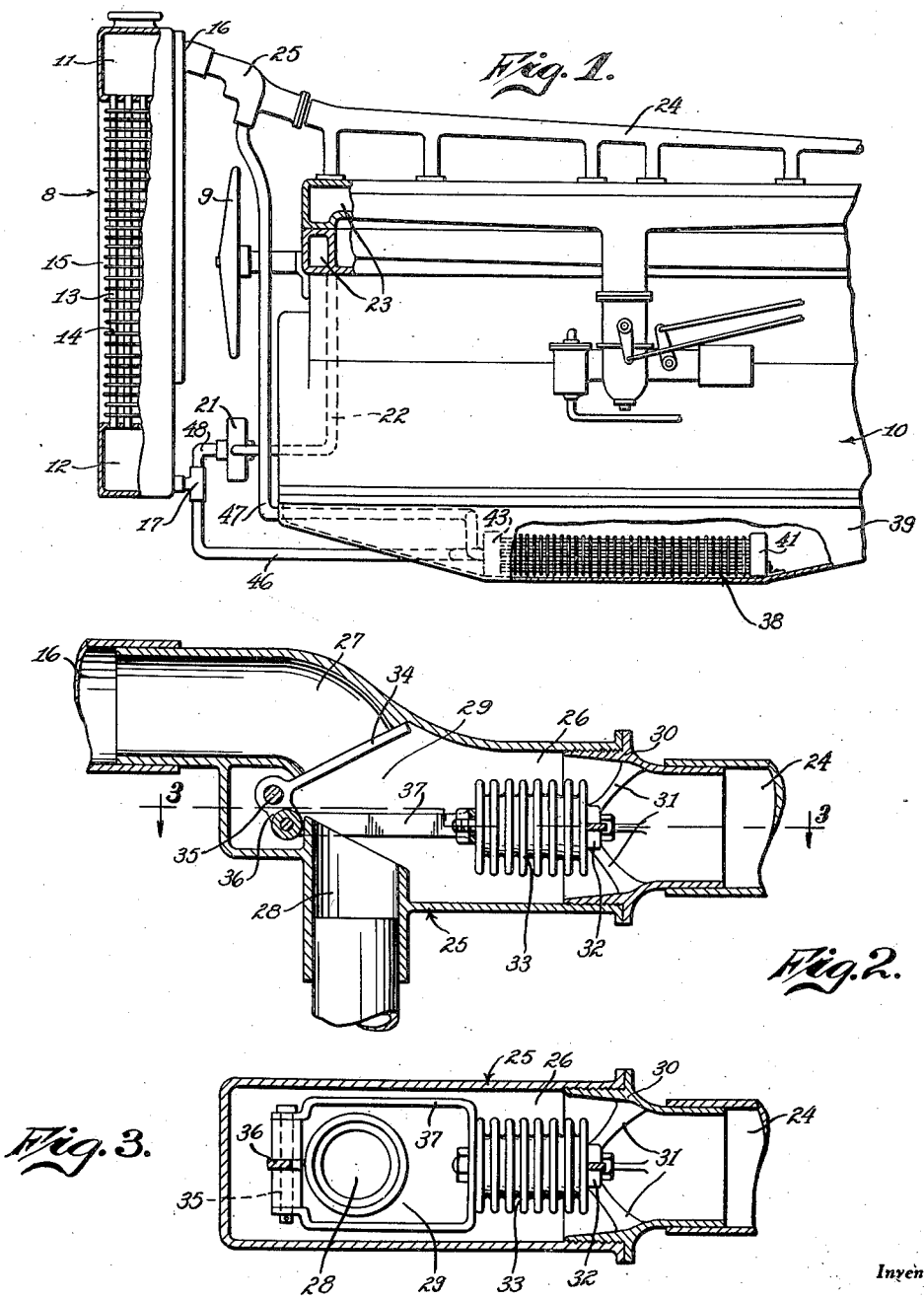

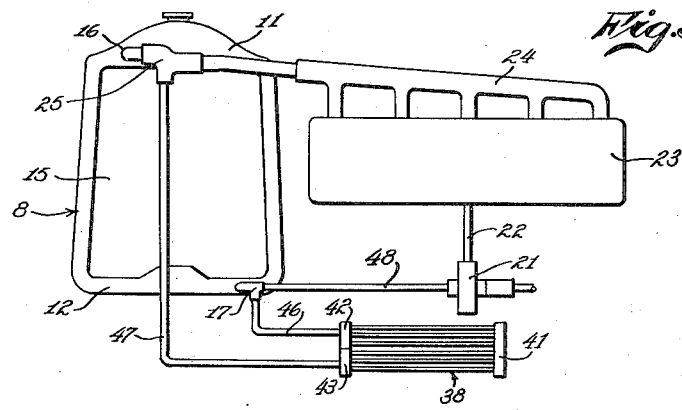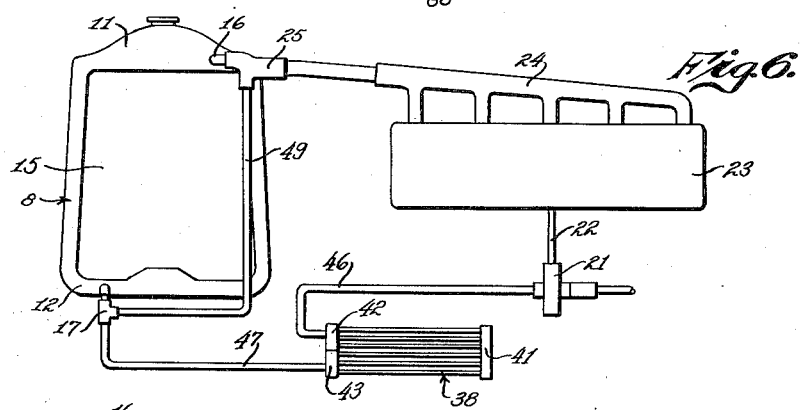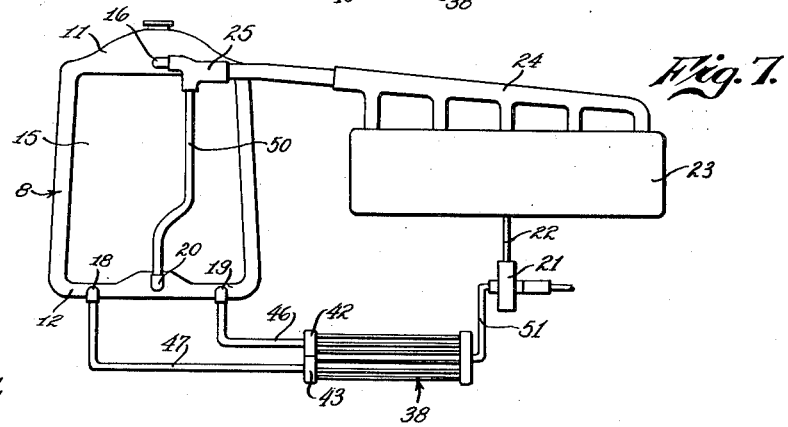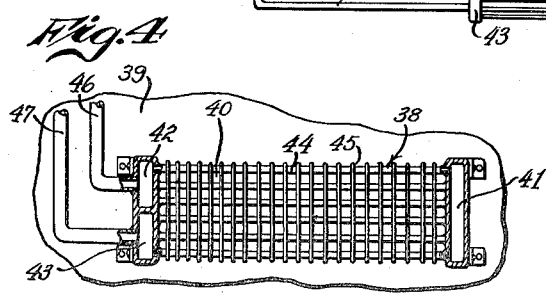

2,063,436

UNITED STATES PATENT OFFICE 2,063,436

MULTIFLOW COOLING FOR INTERNAL COMBUSTION ENGINES

Frederic W. Hild, Los Angeles, Calif.

Application February 24, 1931, Serial No. 517,786

7 Claims. (Cl. 123—196)

My invention relates to cooling systems for internal combustion engines.

One of the objects of this invention is to provide a heat transferring device placed in the oil in the crankcase of the engine, so arranged that a liquid (such as radiator water) for either cooling or heating the oil can circulate through the device in numerous small streams under the pressure of the pump that serves to circulate the liquid through the cooling jacket of the engine.

It is another object of this invention to provide a heat transfer system in connection with the radiator cooling system, for the crankcase oil, in which the heat transfer is accomplished by a device immersed in the crankcase oil, and through which liquid, such as radiator water, is passed, and subjected only to the low pressure of the pump suction.

Figure 1 is a vertical elevation in part section showing the apparatus embodying my invention.

Figure 2 is a sectional elevation of the flow diverter.

Figure 3 is a horizontal section taken on the line 3—3 of Figure 2.

Figure 4 is a plan view in part section of the oil cooler.

Figures 5, 6, and 7 show in diagram three different arrangements of the multiflow cooling systems utilizing the flow diverter.

Referring to the drawings, the radiator 8 is air cooled by fan 9 which is driven by the engine 10 in the customary manner. The radiator has an upper tank 11 and a lower tank 12 which are connected together by numerous tubes 13. The tubes with their radiating fins 14 constitute the cooling core 15. Air drawn through the core 15 cools the liquid in the tubes.

The upper tank 11 has an inlet 16. The lower tank 12, in Figures 1, 5 and 6, has a single outlet into which the T 17 is connected; but the lower tank 12 in Fig. 7 has two outlets 18 and 19, and an intermediate connection 20.

A pump 21 driven by the engine in the usual manner is connected at its discharge end by conduit 22 to the cooling channel 23 which jackets the engine cylinders in the usual way. The said cooling channel discharges into hot water manifold 24 which in turn connects with and discharges into flow diverter 25.

The flow diverter has three water passages 26, 27 and 28 respectively all of which communicate with one another in the common chamber 29. Water passage 26 provides the inlet and water passage 27 and 28 are outlets for the diverter.

Passage 27 connects with radiator inlet 16 so liquid from the diverter 25 may discharge into upper tank 11 of the radiator. Threaded into water passage 26 is inlet coupling 30 which receives the liquid from manifold 24. This coupling has a pair of inwardly projecting arms 31 which meet in the hub 32. A thermostat 33 of the bellows type is secured at one of its ends to the hub 32. Within the chamber 29, a valve 34 is pivotally supported at 35 so that the valve may swing to close either passage 27 or passage 28. Extending from the valve 34 beyond the pivot 35 is a lever arm 36 which is suitably secured to a link 37, and the other end of the link is secured to the movable end of the thermostat 33.

When the thermostat is cold and therefore contracted, the valve 34 is seated in closed position in passage 27 for shutting off circulation therethrough; when the thermostat becomes warm and therefore expands, the valve is moved away from its seat thus opening passage 27 so that the three passages 26, 27 and 28 are in free communication with one another in chamber 29. The valve may be considered fully open when the valve disc 34 is in midway position. When the thermostat expands sufficiently, the valve 34 closes passage 28. Conversely when the thermostat cools and contracts the valve movement is reversed. The movement of the valve to open is opposed by the pressure of the pump 21, and conversely, the movement to close is assisted by the pump pressure.

A heat transferring device 38 is disposed in the oil reservoir in the bottom of the oil pan or crank case 39 of engine 10 below the engine block or frame. This device can serve either to absorb heat from the oil or to transfer heat thereto. At one end of a cooling core 40 is an end tank 41 and at the other end are tanks 42 and 43. The cooling core consists of a number of tubes 44 and radiating fins 45. One half in number of the tubes lead from tank 42 to end tank 41 and the other half lead from the other tank 43 to the end tank. A pipe 46 connected into tank 42 leads through a side of crank case 39, and in like manner a pipe 47 leads from tank 43. The device 38 is immersed in the oil in the crank case and effectively baffles the surging of the oil during movement of the vehicle powered by the engine. Cooling liquid may flow through the device without coming in contact with the oil.

Considering the operation of the several arrangements of the multiflow cooling shown by the diagrams, it is understood that in all of them, upon starting cold,—the valve 34 of the flow diverter 25 is found closed in passage 27 thus shutting off the flow of liquid into the upper tank of the radiator 8; the liquid coming from the manifold 24 must therefore at first discharge only through passage 28.

The large aggregate flow space provided in the heat transfer device 38 by the many small tubes 44 and the relatively large end and outlet tanks, result in comparatively low velocity of the cooling liquid through the device 38. The flow path is long being considerably more than twice the length of the device due to the said path being forward and back both lengthwise and crosswise. The low velocity and the long flow path co-operate to hold the moving liquid for a substantial time period in thermal association with the oil in the crank case. All of these factors together with the large radiating surface of the tubes, the fins and the said tanks, combine to make element 38 a highly effective heat exchange device.

Figure 5 represents the arrangement disclosed in Figure 1. The passage 28 receives pipe 47 which leads to the device 38. The suction end of pump 21 is connected by a pipe 48 to the T 17 and the other opening of the T receives the pipe 46 which also connects with the device 38. It is plain that when starting the engine cold, no water will at first circulate through the radiator 8. The pump 21 will force the water which is rapidly warming in jackets 23 through the manifold 24, flow diverter 25, pipe 47 into tank 43 thence through one half of cooling core 40 into end tank 41 and returning through the other half of the cooling core into tank 42 through pipe 46, T 17, and pipe 48 to pump 21. The heated water flowing through the diverter 25 will cause the thermostat 33 to open the valve 34, whereupon some of the circulating water will discharge into the upper tank 11 of radiator 8 and flow down through the radiator cooling core 15 into the lower tank 12 through T 17 to the pump 21. As the valve opens more widely, the circulation through the radiator increases with corresponding decrease in the device 38 until finally when valve 34 has closed passage 28, there is no circulation through the heat transfer device due to the pump. All of the circulating water then passes through the radiator 8. Thus during the period when the valve 34 does not effect closure of either passage 27 or 28 the circulating stream divides at the flow diverter 25 and reunites at the T 17. Although the forced circulation may be shut off from the device 28,—the coolest water in the system naturally gravitates into this device, because being placed in the crank case it is at the lowest point in the cooling system. Therefore when heated oil in the crankcase heats the water in the device 38,—this heated water moves up into the radiator 8 and is there cooled.

In Figure 6, the passage 28 of the flow diverter is connected by a pipe 49 to the T 17, the other opening of the T receiving pipe 47. The pipe 46 connects directly to the suction end of the pump. In this arrangement too, when starting cold, none of the water moving through the diverter 25 will at first pass through radiator 8. Also when the valve 34 moves from its seat, some and then more circulating water will flow through the radiator 8 until finally when the valve closes passage 28, all of the circulation flows through the radiator. But manifestly all of the circulating water at all times must flow through the heat transfer device 38.

In Figure 7, the passage 28 of the flow diverter is connected by a pipe 50 to inlet 20 of the lower tank 12 of the radiator 8. Pipes 47 and 46 connect to outlets 18 and 19 respectively of the said lower tank. The end tank 41 of the device 38 is connected by a pipe 51 to the suction end of pump 21. When starting cold none of the circulating water will at first flow through the upper tank 11 and cooling core 15 of the radiator 8, but will flow through pipe 50 into lower tank 12 where the stream divides and flows in opposite directions to outlets 18 and 19 to the device 38 through which the divided stream still further divided flows in parallel to be united in end tank 41 of the device 38 thence through pipe 51 to the pump. As in the other diagrammed arrangements, when the valve 34 moves from its seat, the stream of circulating water from the manifold 24 divides at the flow diverter, some of the circulating water and then more and more of it flows into upper tank 11 of the radiator and down the radiator cooling core 15 into lower tank 12, until finally upon closure of passage 28 all of the circulating water passes through the entire radiator. But at all times, all of the circulating water passes through the device 38. In this arrangement, the hot water from the cylinder jacket is always subject to more or less cooling by the radiator, the heat extraction being least when all of the hot water flows through pipe 50 and through lower tank 12 of the radiator.

In all three arrangements the heat transfer device 38 is subject only to very low pressures: the pressure due to the oil is negligible, and the pressure of the circulating liquid in the device 38 is only the low negative pressure of the pump suction thereby reducing leakage liability to the minimum. Another advantage is the coldest liquid must always pass first through the device 38 where it is most needed for extracting heat from the oil, so that the liquid entering the cylinder jacket is always warmer than the liquid in the lower tank of the radiator. This effectively conserves the heat in the engine. This holds true at all times for Figures 6 and 7 and for much of the time for Figure 5.

Still another advantage common to the three arrangements is when valve 34 is open the forced circulation caused by the pump is active and substantially equal in all parts of the radiator. It is well understood that the flow path of such forced circulation from inlet to outlet is that which encounters the least resistance and is the shortest in distance. In each of Figures 5, 6 and 7, the distance and the resistance are equal for each of the numerous paths of the radiator, the flow paths of Figure 7 being shorter than those of Figures 5 and 6.

Although I have described several specific embodiments of my invention, it will be obvious to those skilled in the art, that various modifications may be made in the details of construction, the general arrangement, the association of the several co-operating parts and the application of my invention without departing from the spirit thereof or the principles herein set forth.

I claim as my invention:

1. In combination: an internal combustion engine having a cooling jacket, a radiator for cooling a liquid, a pump for circulating said liquid through the jacket and the radiator, by-passing means including a valve for by-passing the radiator, said valve comprising a body having an inlet passage and two outlet passages and a valve disc pivoted between the outlet passages in such a manner that when the disc is in other than full open position the pump pressure urges the valve disc to close that one of said outlet passages, which lies nearer to it.

2. In a thermal control system for an engine provided with lubricating means: a radiator connected with said engine by a pipe for heated engine-cooling liquid and a pipe for cooled engine-cooling liquid; an intermediate receptacle; connections between the pipes and the receptacle whereby liquid from either of the pipes may be passed through the receptacle; means, associated with said receptacle, for effecting a heat exchange between liquid from said pipes and a lubricant liquid; and means for so varying the flow of one of said liquids through said receptacle as to vary the rate of such heat exchange.

3. In combination: a radiator having a hot water tank and a cooled water tank, an engine having two cooling channels, one through the engine crank case, the other through the engine water jacket, a non-pressure means for conducting liquid from the cooled water tank into the first of said channels, a pump for drawing said liquid through the first channel and forcing the liquid through the second channel, means for connecting the outlet of the second channel with both the hot water tank and the cooled water tank of the radiator, and a valve connected to said means.

4. The combination as defined in claim 3, in which the said means for connecting the outlet of the second channel with both the hot water and the cooled water tank includes a three way connector in which the valve is located, and with the addition of a thermostat for regulating the flow of said liquid through the said second channel.

5. In combination: an internal combustion engine having two cooling channels, one of which is the cylinder jacket and the other of which is in thermal association with the engine lubricant, a radiator having an inlet tank and an outlet tank, a pump for circulating cooling liquid from the radiator through said channels, conduit means for connecting one end of each channel with the outlet tank of the radiator, conduit means for connecting the other end of one channel with the inlet tank of the radiator, conduit means for connecting the other end of the other channel to the conduit connecting to the inlet tank of the radiator, and a valve included in one of said conduits.

6. In combination: a radiator for cooling a liquid, said radiator having an upper and a lower tank, an engine having two separate cooling channels through which said liquid is circulated, one of said channels having a heat exchanger disposed in thermal relation with the engine lubricant, a pump interposed in one of said channels for circulating said liquid, conduit means for connecting one end of each channel with the lower tank of the radiator, conduit means for connecting the other end of one channel with the upper tank of the radiator, conduit means for connecting the other end of the other channel to the conduit connecting to the upper tank of the radiator, and a valve included in one of said conduits.

7. In combination, a radiator for cooling a liquid, said radiator having upper and lower tanks, an engine having a cylinder water jacket, a heat exchanger disposed in thermal association with the engine lubricant, a pump for circulating said liquid, said cylinder jacket, said heat exchanger and said pump being connected in series relation, conduit means for connecting one end of the cylinder jacket and one end of the heat exchanger to the lower tank of the radiator, conduit means connecting the other end of the cylinder jacket to the upper tank of the radiator, conduit means connecting the other end of the heat exchanger to the conduit connected to the upper tank of the radiator, and a thermostatically controlled valve included in the last mentioned conduit for regulating said circulation.

FREDERIC W. HILD.